Figure 1:
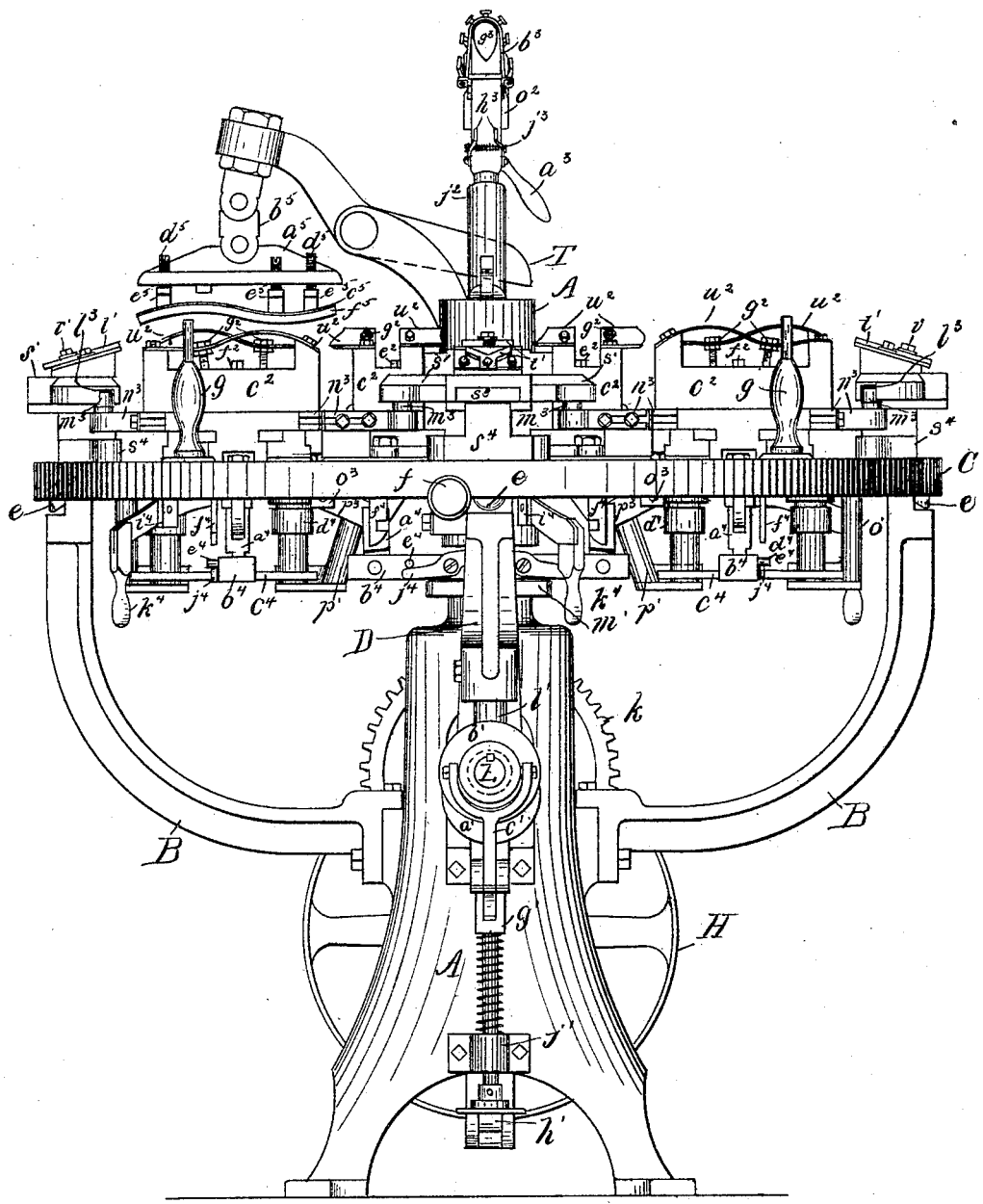

(No Model.) 10 Sheets—Sheet 1.

G. McPHERSON.
LASTING MACHINE.

No. 459,165. Patented Sept. 8, 1891.

WITNESSES.
Emerson B. Pettit
Robert Wallace.

INVENTOR.
George McPherson
by Herbert A. Macleod
his Atty.

(No Model.) 10 Sheets—Sheet 2.

G. McPHERSON.
LASTING MACHINE.

No. 459,165. Patented Sept. 8, 1891.

Fig. 2ᵃ    Fig. 2

WITNESSES.
Emerson B. Pettit
Robert Wallace.

INVENTOR.
George McPherson,
by Wm H. MacLeod
his atty (No Model.) 10 Sheets—Sheet 4.

G. McPHERSON.
LASTING MACHINE.

No. 459,165. Patented Sept. 8, 1891.

WITNESSES.
Emerson R. Pettit
Robert Wallace

INVENTOR.
George McPherson,
by Wm A. Macleod
his atty (No Model.) 10 Sheets—Sheet 5.

G. McPHERSON.
LASTING MACHINE.

No. 459,165. Patented Sept. 8, 1891.

WITNESSES.
Emerson B. Pettit,
Robert Wallace.

INVENTOR.
George McPherson,
by Wm. A. Macleod,
his atty.

(No Model.) 10 Sheets—Sheet 6.
G. McPHERSON.
LASTING MACHINE.

No. 459,165. Patented Sept. 8, 1891.

WITNESSES. INVENTOR.

(No Model.) 10 Sheets—Sheet 7.

G. McPHERSON.
LASTING MACHINE.

No. 459,165. Patented Sept. 8, 1891.

WITNESSES.
Emerson R. Pettit
Robert Wallace.

INVENTOR.
George McPherson
by Wm A. Macleod
his Atty (No Model.) 10 Sheets—Sheet 8.
G. McPHERSON.
LASTING MACHINE.
No. 459,165. Patented Sept. 8, 1891.
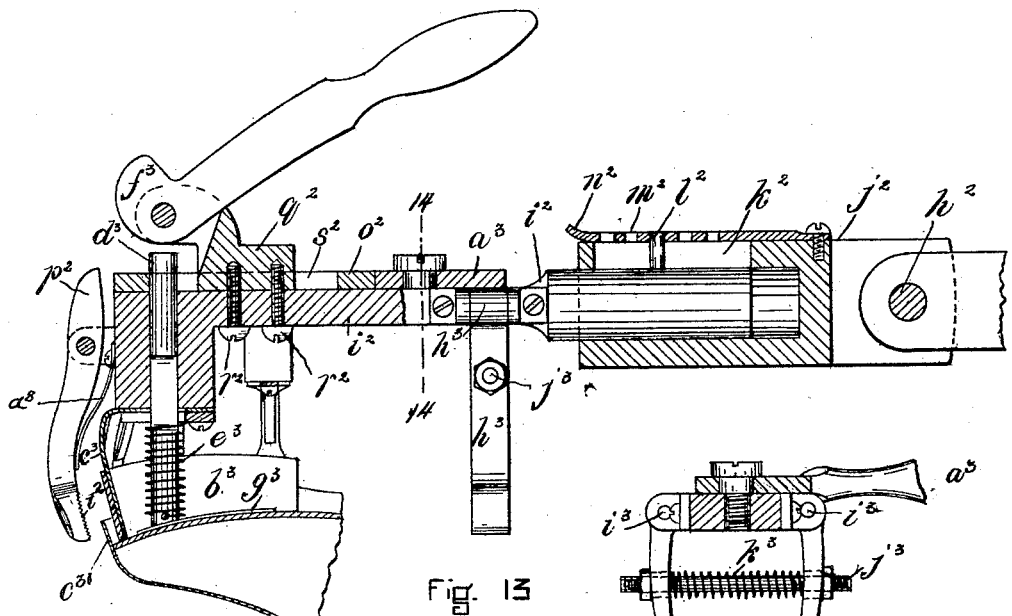
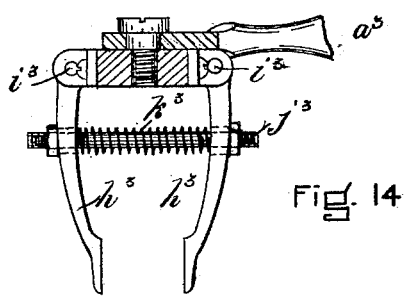
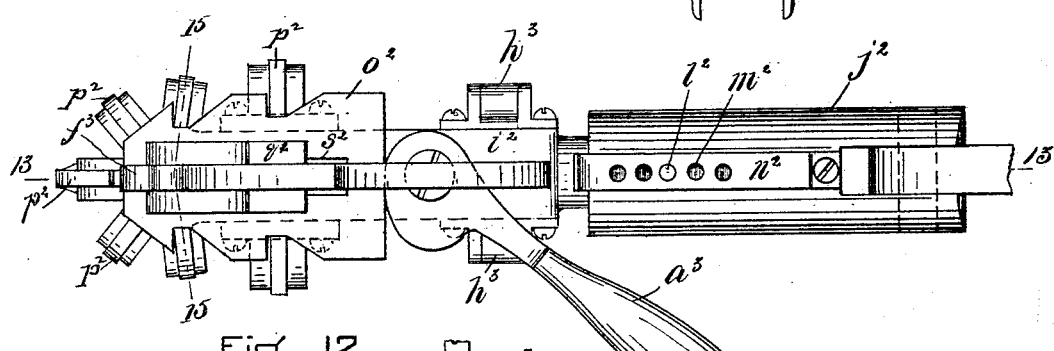
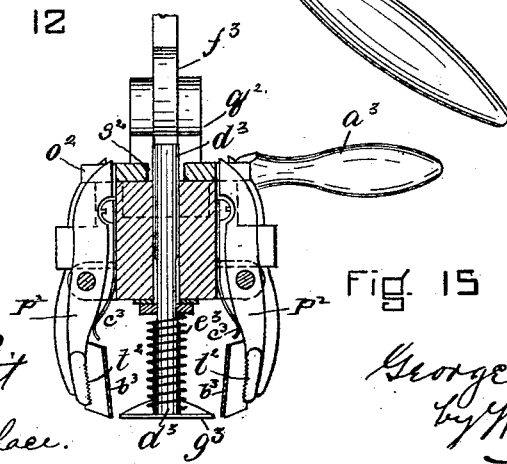
WITNESSES.
Emerson B. Pettit
Robert Wallace
INVENTOR.
George McPherson,
by Wm A. Macleod
his atty.

(No Model.)  10 Sheets—Sheet 9.

G. McPHERSON.
LASTING MACHINE.

No. 459,165.  Patented Sept. 8, 1891.

WITNESSES.
Emerson B. Pettit
Robert Wallace

INVENTOR.
George McPherson
by Wm McLeod
his Atty (No Model.) 10 Sheets—Sheet 10.

G. McPHERSON.
LASTING MACHINE.

No. 459,165. Patented Sept. 8, 1891.

WITNESSES
Emerson B. Pettit
Robt. Wallace

INVENTOR
George McPherson
by Wm. A. Macleod.
his Atty.

UNITED STATES PATENT OFFICE.

GEORGE McPHERSON, OF LYNN, MASSACHUSETTS, ASSIGNOR, BY MESNE ASSIGNMENTS, TO THE NATIONAL LASTING MACHINE COMPANY, OF KITTERY, MAINE.

LASTING-MACHINE.

SPECIFICATION forming part of Letters Patent No. 459,165, dated September 8, 1891.

Application filed May 13, 1890. Serial No. 351,675. (No model.)

*To all whom it may concern:*

Be it known that I, GEORGE MCPHERSON, of Lynn, county of Essex, State of Massachusetts, have invented certain new and useful Improvements in Lasting and Sole-Laying Machines, of which the following is a specification.

My invention is an improvement on the machine shown and described in Letters Patent of the United States No. 391,001, dated October 9, 1888, to Charles T. Wood; and it has for its chief object to simplify and cheapen the said machine shown in the said Letters Patent to Wood and to render it more effective and certain in its operation.

To this end my invention consists in the mechanism hereinafter more fully described and the organization of the same in a single machine, all as is more particularly pointed out in the claims which are appended hereto and made a part hereof.

I have shown my machine in the accompanying drawings in the best form now known to me, and in the following description I shall refer thereto, using like letters of reference to indicate like parts in said drawings, in which—

Figure 2:
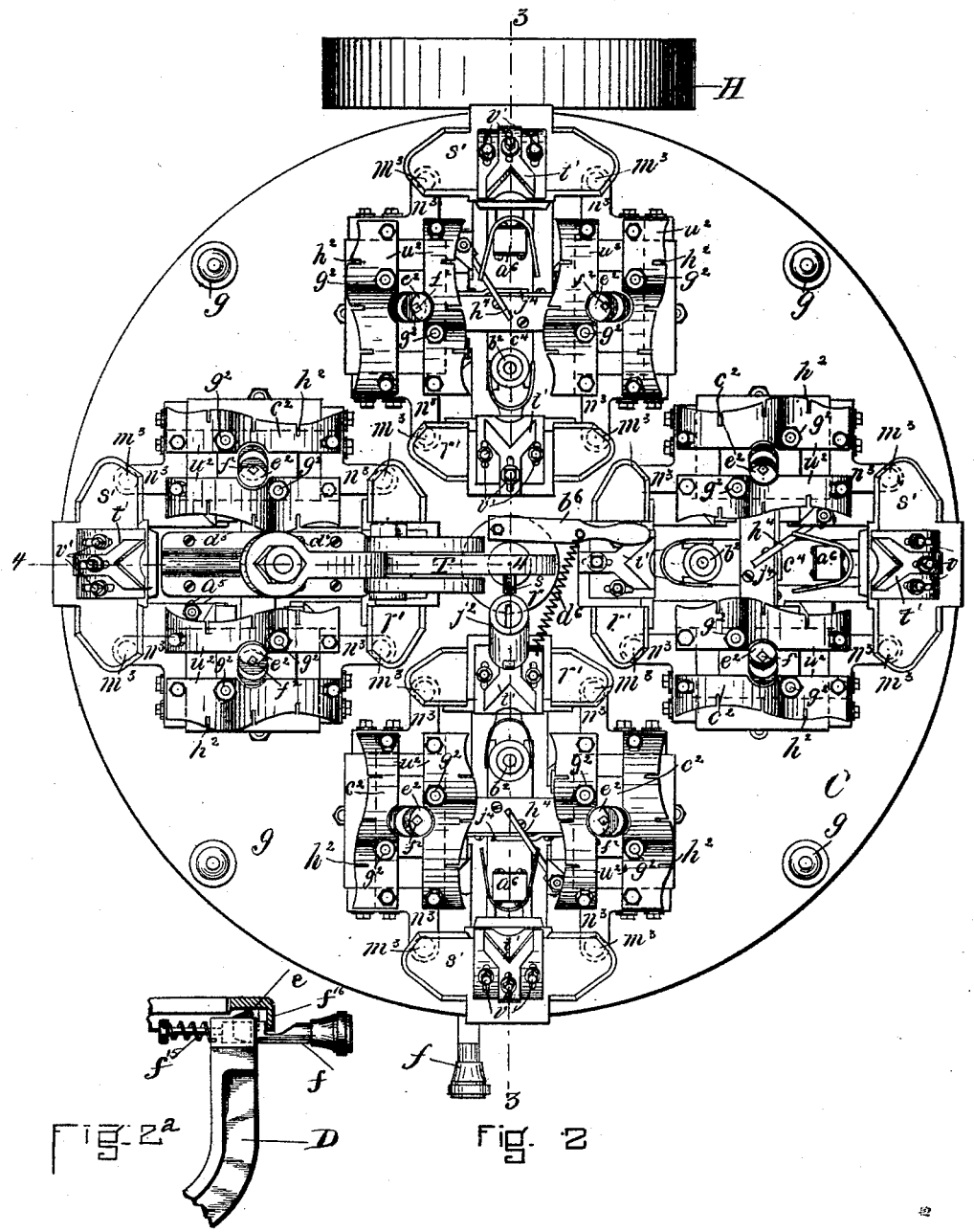
Figure 3:
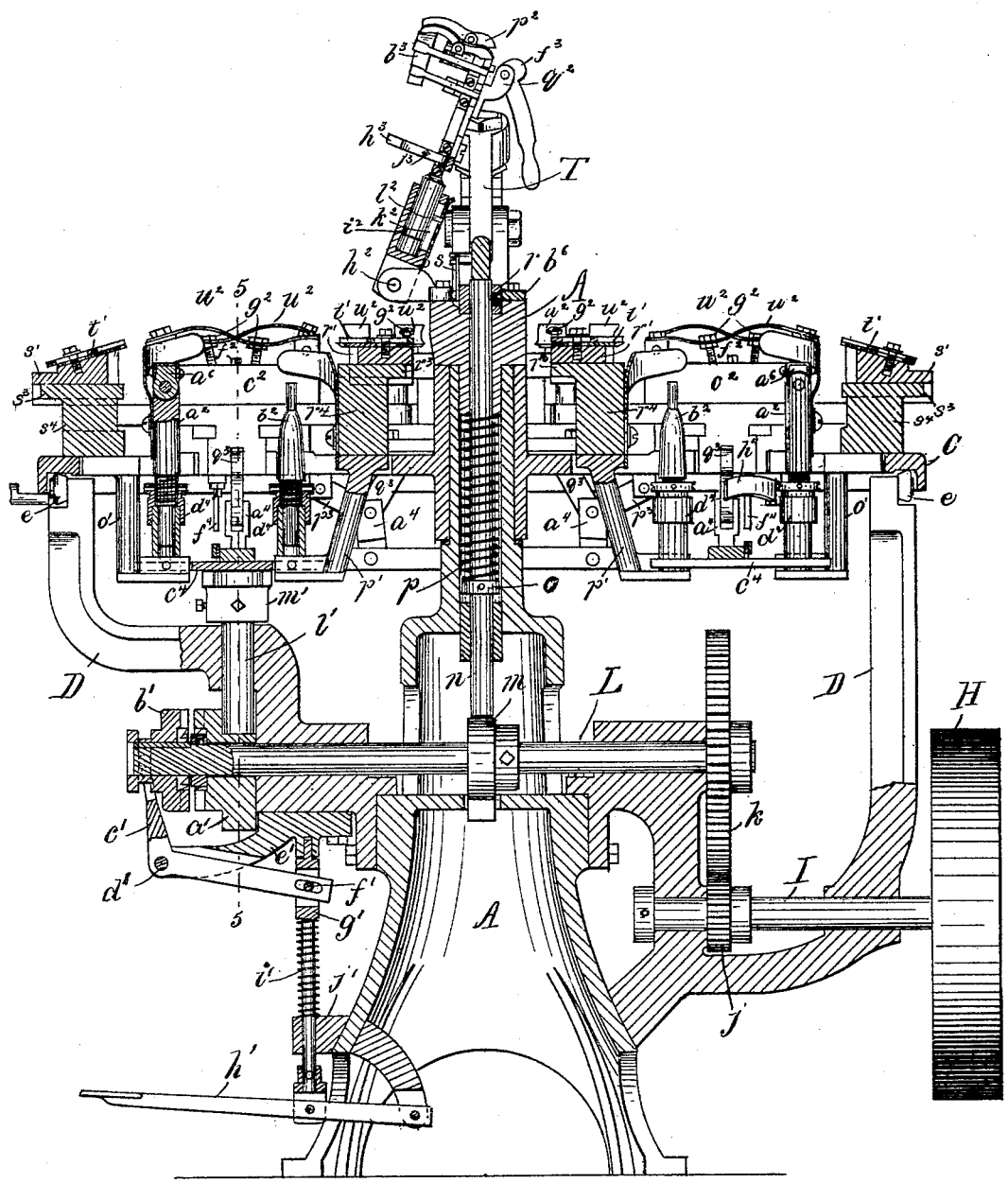
Figure 4:
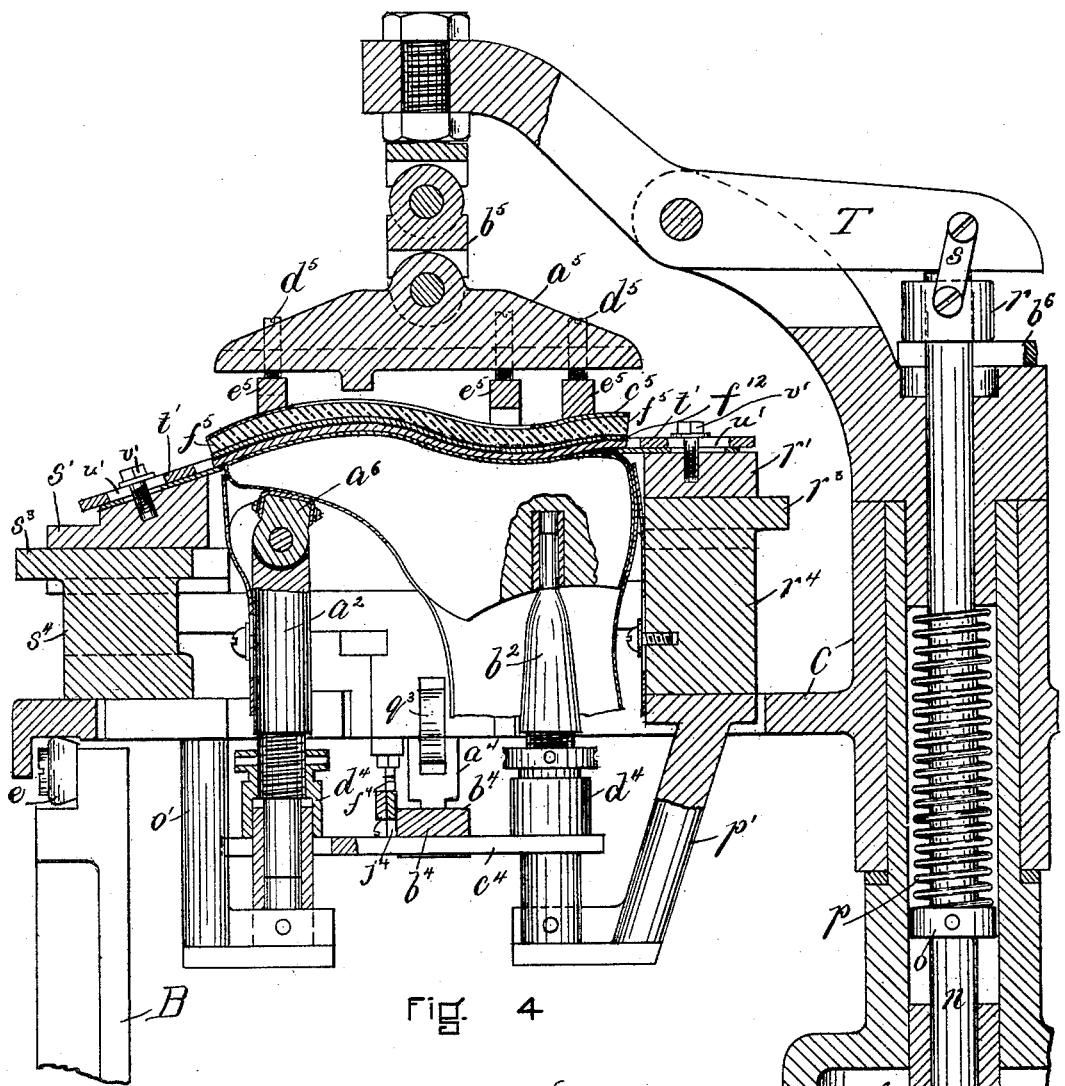
Figure 18:
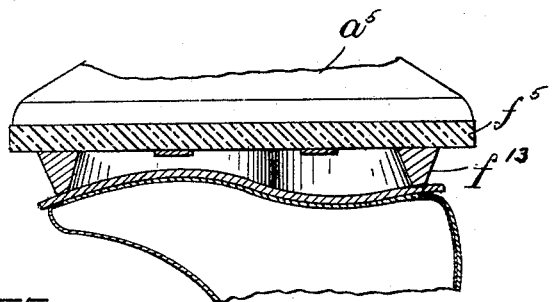
Figure 5:
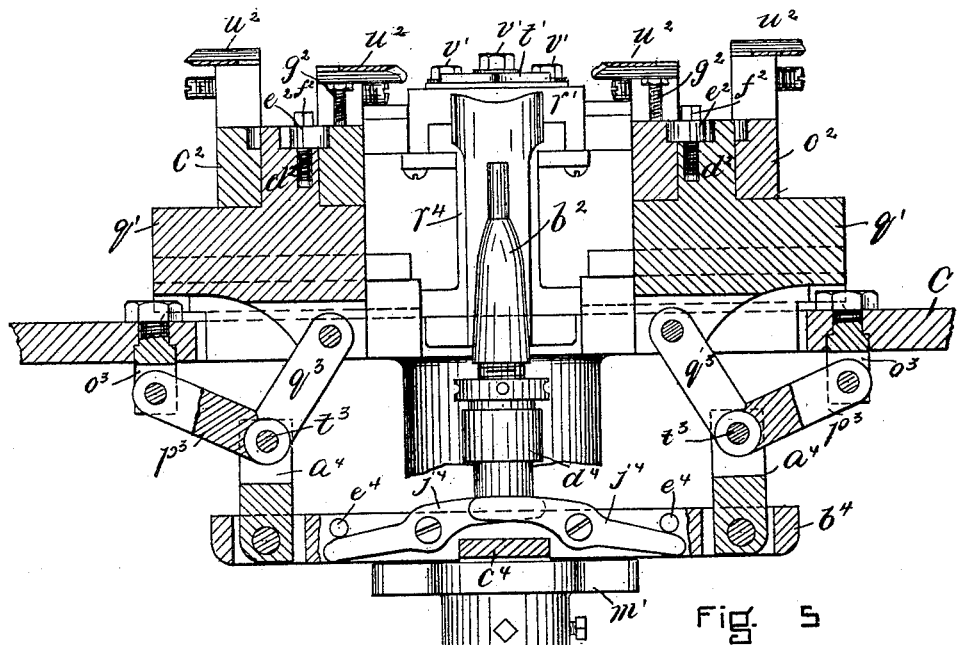
Figures 7, 8:
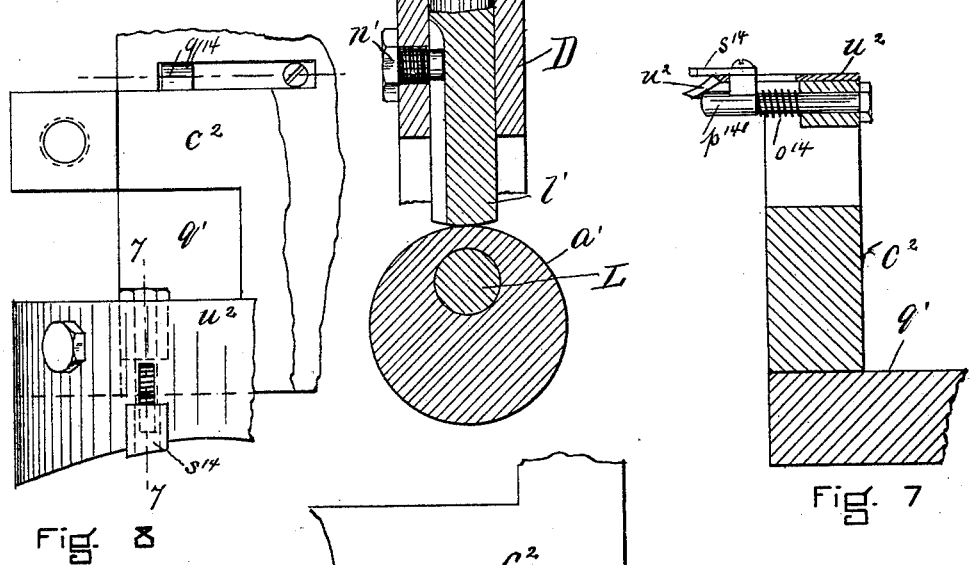
Figure 9:
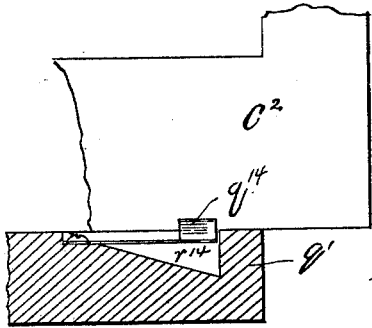
Figure 6:
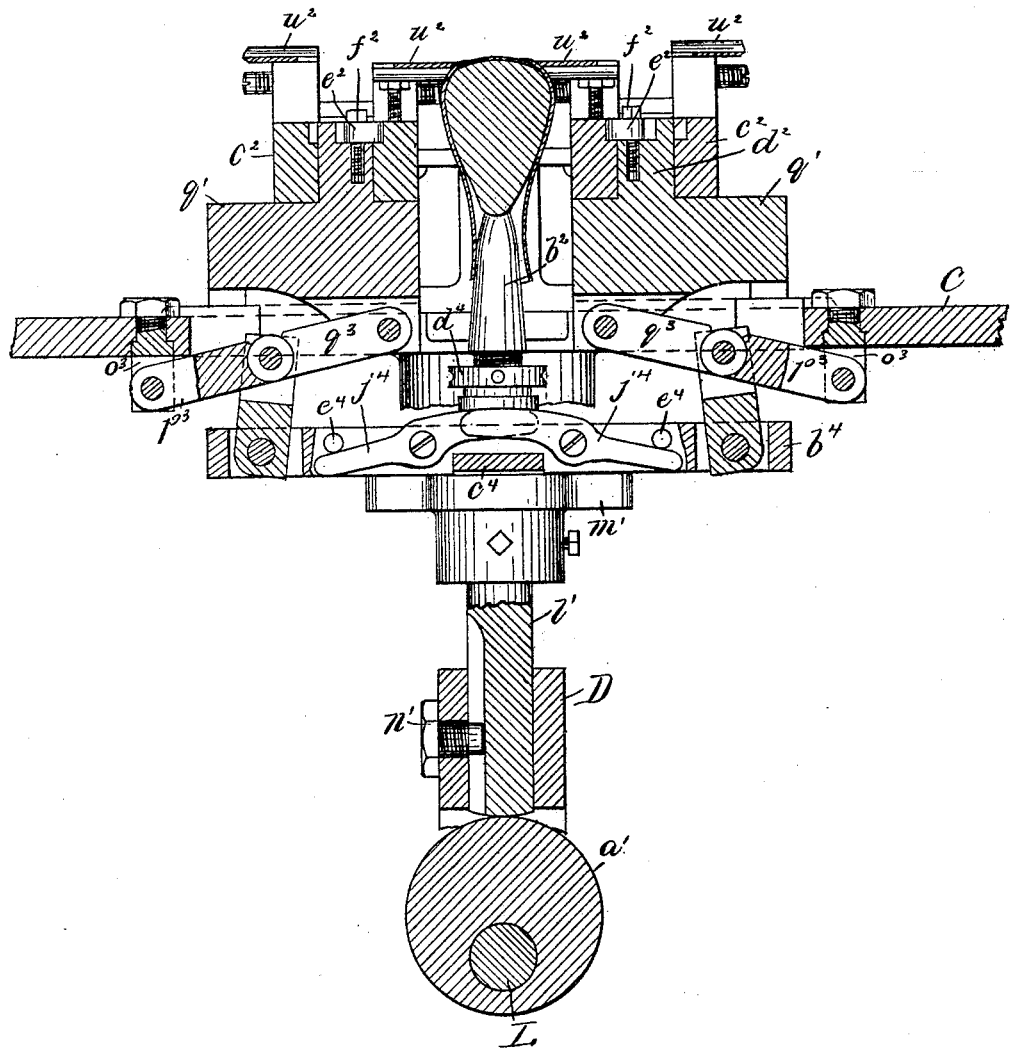
Figure 10:
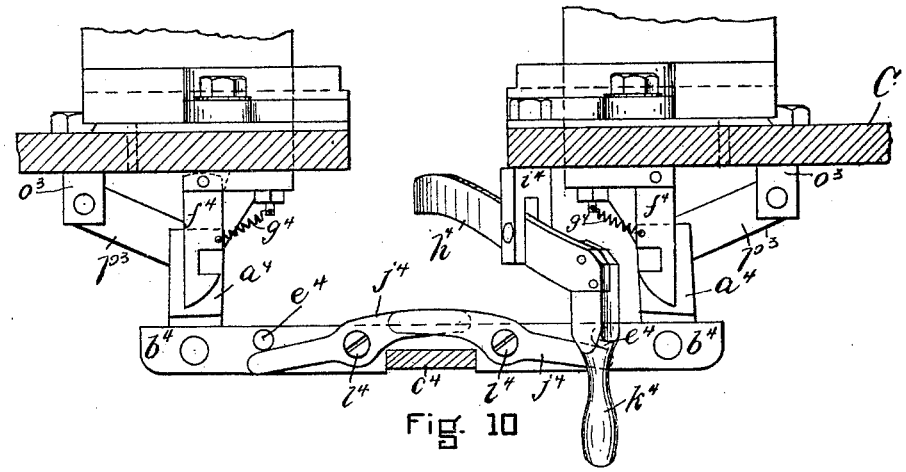
Figure 11:
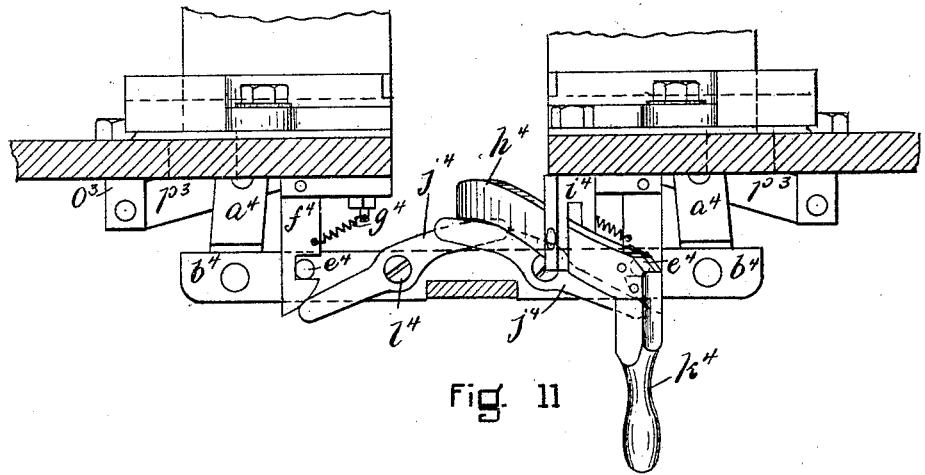
Figure 16:
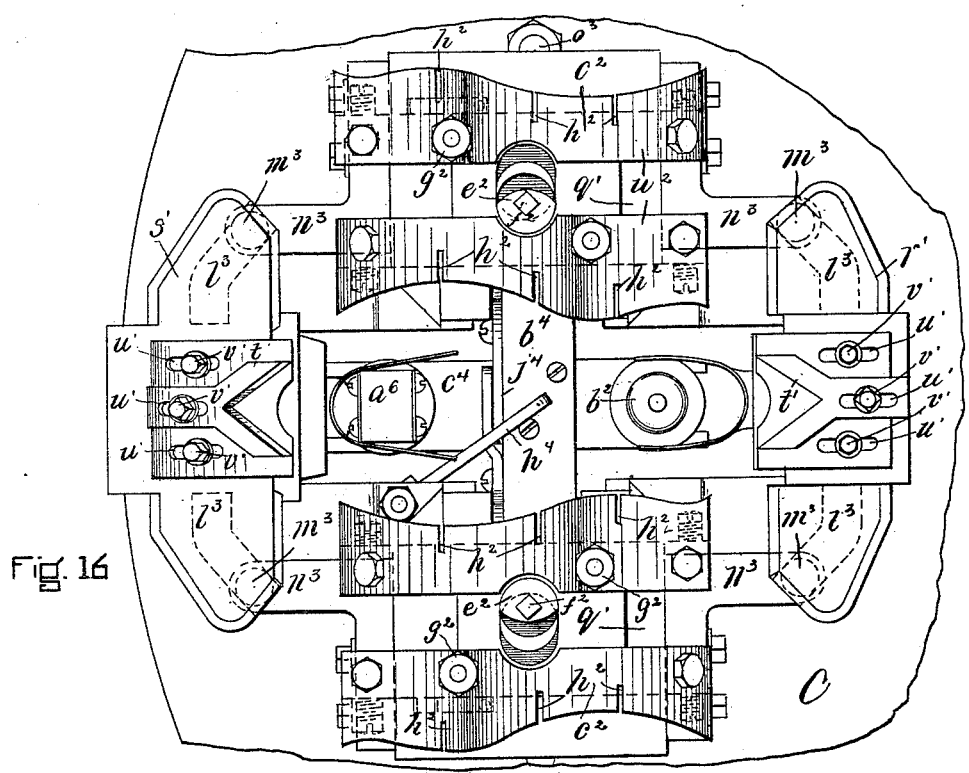
Figure 17:
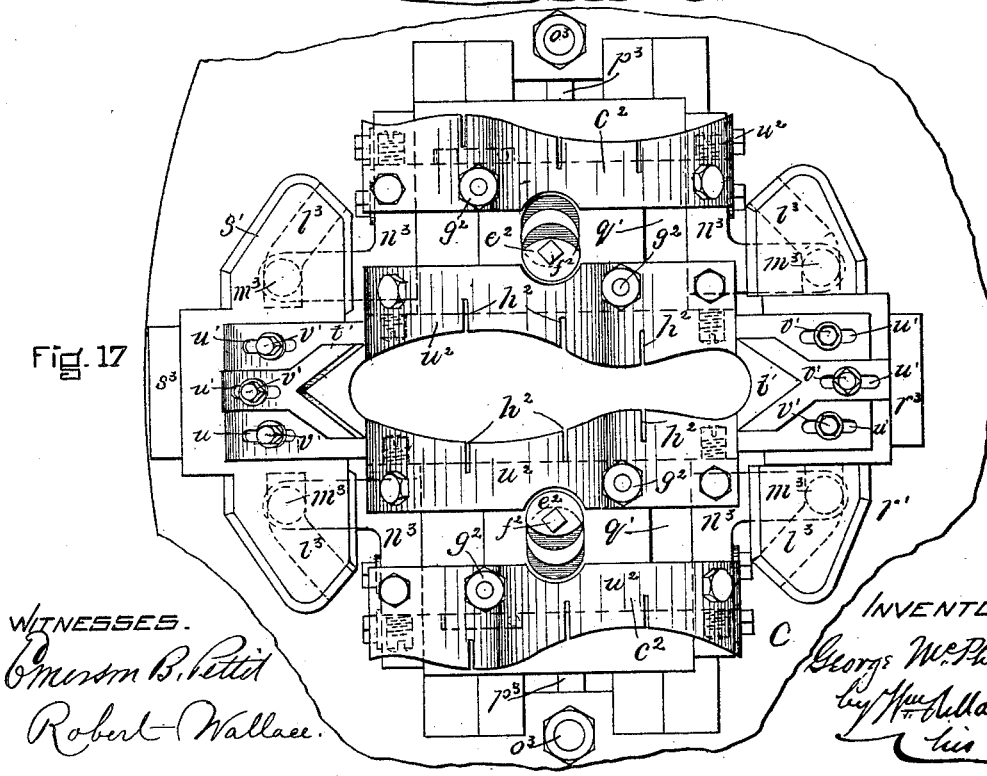
Figure 19:
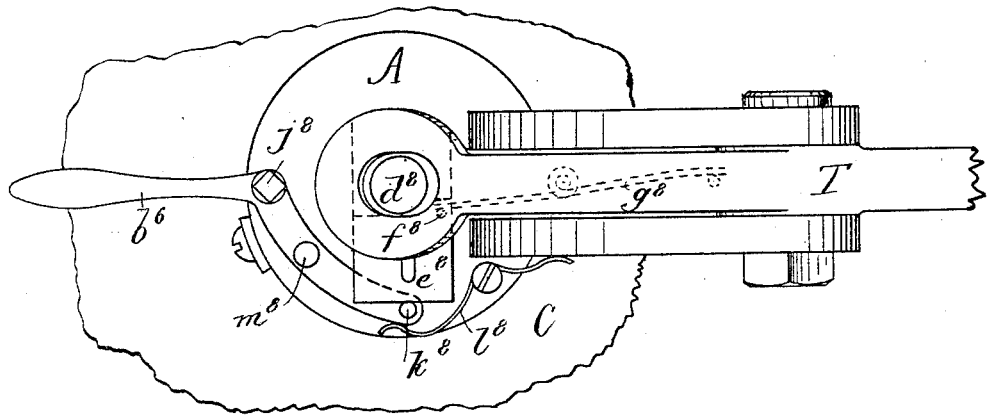
Figure 20:
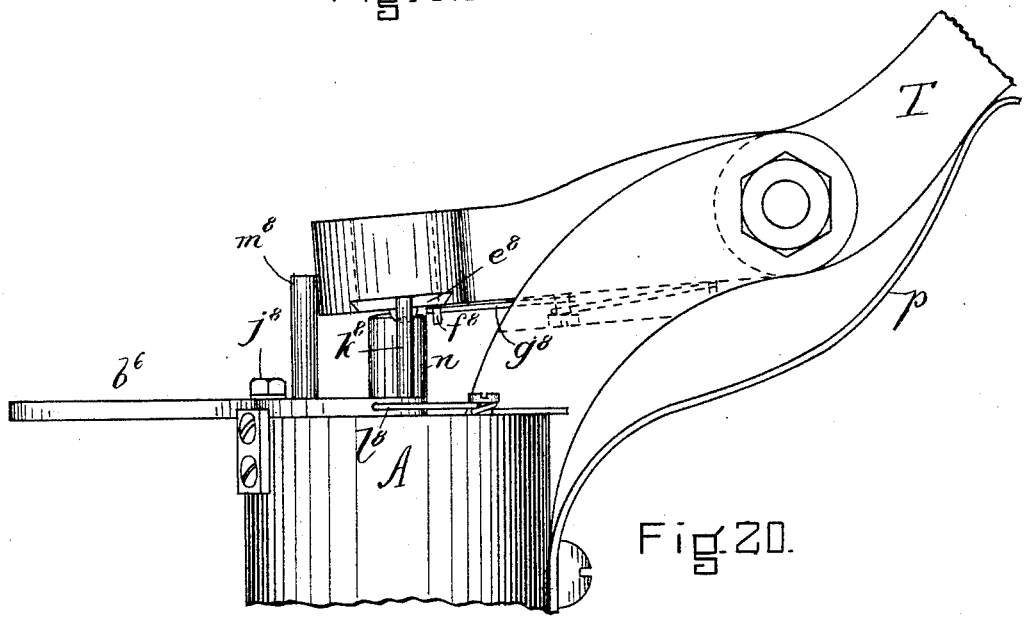
Figure 21:
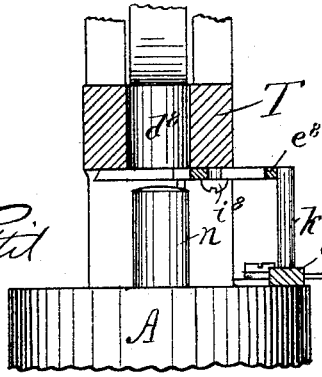

Figure 1 is a front elevation. Fig. 2 is a plan view. Fig. 2ª is a detail view to show the stopping catch or bolt. Fig. 3 is a section on line 3 3, Fig. 2, some of the parts on said line being shown in full. Fig. 4 is a section on line 4 4, Fig. 2. Fig. 5 is a section on line 5 5, Fig. 3. Fig. 6 is a similar section, but showing a shoe in position and the lasting jaws or plates closed in the act of lasting the shoe. Figs. 7, 8, and 9 are details to be hereinafter referred to. Figs. 10 and 11 are elevations showing the mechanism for opening the lasting jaws or plates and the hand-lever by which said mechanism is operated. Fig. 12 is a plan view of the toe-crimping attachment. Fig. 13 is a section on line 13 13 of Fig. 12. Fig. 14 is a section on line 14 14, Fig. 13. Fig. 15 is a section on line 15 15, Fig. 12. Figs. 16 and 17 are plan views showing the lasting-plates open and closed. Fig. 18 is a detail showing a modification of the sole-laying apparatus. Fig. 19 is a plan view, and Fig. 20 is an elevation, of the rear end of the lever T, which actuates the sole-laying block, showing a modified form of the lever $b^6$ and mechanism connected therewith by means of which the lever T may be prevented from operating and the sole-laying block may be kept either pressed against the sole or free from the sole, as desired. Fig. 21 is another view thereof, partly in section, showing the construction of the sliding plate, which, when in one position, allows the rod $n$ to pass up through the end of the lever T without operating the lever, and when in another position receives the upward thrust of the rod $n$ and causes the lever to operate.

A is a standard or supporting-frame, which serves as a support for all the parts of the machine.

B are curved supporting-arms, which are bolted securely to the standard A and which help to support the revolving table C.

D are front and rear projecting arms, (see Fig. 3,) which also serve with the arms B to support the revolving table C, but which are modified in shape to accommodate the shafting and running-gears and some other parts which are located below the table. The arms D are also bolted securely to the support A, as shown in said Fig. 3. The table C is journaled on the upright support A centrally and rests on anti-friction rolls $e$, set in the ends of the supporting-arms, and which serve to decrease the friction of the table when it is moved. To the table C is directly secured the greater part of the lasting mechanism proper, which is carried and supported thereby. Before describing specifically the mechanism it may be well to state generally that the operator stands in front of the machine (Figs. 1 and 2) or at the left of Fig. 3. There are four sets of lasting mechanisms, which are all alike. (See Fig. 2.) The shoe is lasted at the front of the machine, then swung to the left by swinging the table through a quarter of the circle. The sole is then laid and firmly pressed down by the action of the sole-laying mechanism, during which time another shoe is lasted. The table is then swung again through a quarter of the circle, carrying the first shoe around to that part of the table opposite the operator and shifting the one which has just been lasted to the sole-laying mechanism. The operation is again repeated, the first shoe coming around to the right of the operator, where it may be removed by a boy or another operator, who is there for the purpose and who puts another shoe in its place. The table C is stopped at a given point by the spring-impelled catch or bolt $f$. The spring $f^{15}$, Fig. 2$^a$, serves, normally, to hold the said clutch or bolt $f$ outward in engagement with any one of a series of properly-spaced notches in the flange $f^{16}$ of the table C. To move the table, the operator shoves this bolt $f$ against its spring, clearing it from the recess in the flange of the table in which it is received, seizes the handle $g$, which is at his right and projects upwardly from the top of the table, and moves the table toward his left until the spring-bolt $f$ snaps into the next recess in the flange of the table, in which position the table will be in the right position to last another shoe, and the shoe which has just been lasted will be in position to have the sole laid by the sole-laying mechanism.

The driving mechanism is below the table and is as follows: H is a driving-pulley secured to a shaft I, journaled in the rearwardly-projecting arm D. (See Fig. 3.) The shaft I carries a pinion $j$, which is in mesh with a gear $k$, fast on the counter-shaft L, which is also journaled at one end in the rearwardly-projecting support D and at the other end in the forwardly-projecting support D. The shaft L passes centrally through the upright A, said upright being cut away, as shown at Fig. 3, to accommodate it. A cam $m$ is securely bolted to this shaft inside the support A (see Figs. 3 and 4) and operates to force the vertically-movable rod $n$ up at each revolution of the shaft L, the end of said rod $n$ resting on the cam, as shown. The rod $n$ passes up through the center of the support A, sliding in an aperture therein, and is provided with a collar $o$, fast thereto, and a spiral spring $p$, which is placed between the collar $o$ and the upper bearing of the rod $n$ in the support A, so that as the rod $n$ is forced upwardly by the cam the spring $p$ is compressed and tends to force the rod downwardly. As soon as the cam $m$ has passed the position shown in Fig. 4 and the projection thereon has cleared the end of the rod $n$, the spring $p$ throws the rod $n$ downwardly, as will be clear. The upper end of the rod $n$, above the top of the support A, is provided with a collar $r$, which is fast thereto, and a link $s$ is pivoted thereto, the upper end of said link being pivoted to the end of the lever T, which operates the sole-laying mechanism, to be hereinafter described. By means of the collar $r$ and link an adjustment is obtained between the rod $n$ and the lever T, and thus the pressure of the sole-laying mechanism may be regulated. The forward end of the shaft L is provided with a cam $a'$, which is secured thereto, and the front face of which is one member of a clutch device of ordinary construction, the movable member of said device being shown at $b'$. The movable member $b'$ is splined on the shaft L, and while it revolves with the shaft may be slid lengthwise thereof in the well-known manner. An annular groove in the movable clutch member $b'$ receives the forked ends of the shipper-lever $c'$, which is pivoted at $d'$ to a forwardly-projecting arm $e'$, which is bolted to the arm D. The rear end of the shipper $c'$ is slotted and receives a pin $f'$ in the vertical rod $g'$, the lower end of which is connected with the treadle $h'$, so that it may be thrown down by a pressure of the foot. A spring $i'$ encircles the rod $g'$ between the enlarged upper end thereof and the lug $j'$ on the frame A, which serves as a bearing for the lower end of the rod. This spring serves to raise the rod and treadle when the foot of the operator has been removed therefrom. Where the end of the shipper $c'$ is secured to the rod $g'$ by the pin $f'$ the rod $g'$ is slotted to receive the end of said shipper, as will be clear from Fig. 1. The upper end of the rod $g'$ slides in a guiding-recess made in a downward projection from the arm $e'$, as shown in Fig. 3. It will be clear that if the treadle $h'$ is depressed the movable clutch member $b'$ will be thrown into clutch with the member $a'$, causing the latter to revolve, and since the latter is also a cam and in contact with the lower end of the vertically-movable rod $l'$ it will operate to force the said rod $l'$ upwardly. (See Fig. 5.) The rod $l'$ is set in an aperture in the supporting-arm D, and is provided at its upper end with a collar $m'$, fast thereto, by means of which its throw may be varied. It will also be clear that the vertical rod $l'$ will be moved vertically once at each revolution of the shaft L. The lasting mechanism proper is operated by the movement of the rod $l'$, the operation of lasting proper being completed when the rod $l'$ has reached the highest point of its movement. At this time said rod, its operating-cam, and the lasting mechanism are in the positions shown in Fig. 6, the same parts being shown at the other end of their movement—that is, when the rod $l'$ is down—in Fig. 5. A vertical slot in the rod $l'$ receives the end of a screw-bolt $n'$, set in the supporting arm or frame D, and which serves to prevent the bolt $l'$ from turning in its bearing.

The table C is provided with a cross-shaped opening for each lasting device which is located thereon. Through this opening project upwardly the supports $a^2 b^2$ for the toe and heel of the last. (See Fig. 4.) These supports are adjustably mounted on downwardly-projecting arms $o' p'$, which are secured to the stationary blocks $s^4 r^4$, and which form a solid support for the last. The toe-support $a^2$ is provided at its upper end with a self-adjusting block $a^6$, (see Fig. 4,) said block being pivoted in the top of the support $a^2$ by a pivot passing therethrough crosswise of the last. By this arrangement the toe of the last rests firmly on the whole surface of the block $a^6$, said block accommodating itself when the last is presented to it to any change in the angle at which the last is set or in the curve of the last itself. In this way a very firm bearing of the last on the support is secured. On either side and at either end of the said opening in the table are placed carrier-blocks, the side blocks being shown at $q'$ and the heel and toe blocks at $r'$ $s'$, respectively. The blocks $q'$ are set in ways on the table, while said blocks $r'$ $s'$ are similarly mounted on the blocks $r^4$ $s^4$, so that the side blocks, as also the heel and toe blocks, may slide toward and from each other. The top of the toe-blocks $s'$ is inclined somewhat, as shown in Fig. 4, and on top of both the heel and toe blocks is secured a lasting-plate $t'$, said plates being adjustably mounted on said blocks by means of the slots $u'$ and bolts $v'$, so that their position may be changed when desired. On the side blocks $q'$ are mounted the pivoted or swinging blocks $c^2$, which are provided with a central aperture vertically through them, by means of which they are set on a vertical projection $d^2$ on the blocks $q'$. The projections or studs $d^2$ may be integral with the blocks $q'$ and should be circular in cross-section. The blocks $c^2$ are in fact merely the upper portions of the carrier-blocks $q'$ made separate from said carrier-blocks, so as to be capable of being turned around to present another set of lasting-plates to the shoe. If only one set of lasting-plates were to be used—that is, if all the shoes to be lasted were of one size and shape—then the blocks $c^2$ and $q'$ might be integral and might form one block. The lasting-plates $u^2$ are curved to fit the last, and each of the swinging blocks $c^2$ is provided with two sets of plates, one on either side thereof, as shown, Figs. 2, 16, and 17, so that the machine may be adapted to last shoes of two different shapes, it being only necessary in changing from one form of shoe to the other to loosen the cam-shaped locking device $e^2$, turn it a quarter round until it registers with the stud or projection $d^2$, then turn the block $c^2$ through half the circle until the lasting-plate on the opposite side is in position to operate on the shoe which is to be lasted, then turn the cam-lock $e'$ back again and securely set it to hold the block $c^2$ rigidly in its new position.

The precise construction of the locking device $e^2$ is not material, as various well-known forms of locking device might be used; but the form shown will be clearly understood from Figs. 6, 16, and 17, and consists simply of a screw-bolt $f^2$, which passes through the eccentric or cam-block $e^2$, said block being set in a recess cut to receive it in the top of the projection $d^2$ and being when swung into its locking position received in a recess which is cut in the proximate face of the aperture in the swinging block $c^2$. I do not, however, claim this feature of the two sets or series of lasting-plates on each side of the last and mounted on a carrier adapted to be turned around to bring either set into operative position. The lasting-plates $u^2$, which act upon the sides of the shoe and which co-operate with the heel and toe plates $t'$ in lasting the shoe, are rigidly secured at either end to projections which rise from the swinging blocks $c^2$, (see Fig. 3,) the central portions of the lasting-plate between these projections being unsupported, except at the shank part of the plate, where a screw-bolt $g^2$ passes through the plate and into the block $c^2$. This bolt has a check-nut underneath the plate, the plate being held securely between the head of the bolt and the said check-nut. This bolt not only strengthens and stiffens the plate, but the plate being somewhat flexible its curves may be modified slightly by screwing in or unscrewing the said bolt $g^2$, and thus the plate may be slightly changed to suit various shapes of lasts. The lasting-edges of the plates are smooth, and they are preferably slitted, as shown at $h^2$, in order that one part of the plate may yield slightly independently of the other parts. This is desirable when, for example, a thicker counter is used than the average or some other part is thicker than is usually employed, in which case the part of the plate which comes in contact with the thickest portion of the shoe may yield slightly to accommodate itself to the increased thickness without varying the position of the other parts of the plate. The heel and toe plates $t'$ are rounded out or recessed, as shown, on the edges which come in contact with the shoe to fit the last at the heel and toe. These edges are, like those of the side plates, preferably smooth, and the toe-plate, which is next the operator, (see Fig. 4,) is set on a slant corresponding substantially to the surface of the toe of the last, and in order that the securing-bolts on said plate may be down and so out of the way and not liable to interfere with the operator when he is using the machine. In lasting a shoe the heel and toe plates, as also the side plates, are caused to approach each other and thus to close in on the shoe when it is in position; but in order to seize the upper and draw it smoothly into place over the sides of the last it is necessary to provide a yielding opposing surface, between which and the edge of the plates the upper may be seized throughout a portion at least of the edge of the last. This is accomplished by the crimping device, which is shown thrown back in Fig. 3 and which is shown in position for use in Fig. 13. This device is pivoted at $h^2$ to a lug or projection on the top of the standard A, so that it may be raised out of the way when it is not required, and it consists of an adjustable arm $i^2$, set in a socket or shank $j^2$, the said socket being cut away or provided with an aperture $k^2$, into which the rear end of the arm $i^2$ slides. This end of the arm $i^2$ is provided with a pin $l^2$, rigidly set therein, and which projects upwardly into one of a series of holes $m^2$ in a spring latch or plate $n^2$ on the socket $j^2$. By raising this latch or plate $n^2$ the arm $i^2$ may be set forward or back, the pin $l^2$ entering another of the holes $m^2$ and serving to hold the arm $i^2$ in its new position. By this arrangement the arm $i^2$ may be lengthened or shortened, as desired. On top of the forward portion of this arm $i^2$ a sliding plate $o^2$ is mounted, which is of the shape shown in Fig. 12, and the purpose of which is to close the disconnected or independent crimping-fingers $p^2$, and so gather in and crease the fullness of the upper around the toe of the shoe. The movement of the plate $o^2$ is guided by the lug or projection $q^2$, which is firmly secured to the arm $i^2$ by means of the screws $r^2$. The projection $q^2$ fits a slot $s^2$ in the plate $o^2$—that is, it fits the slot widthwise, while the slot is considerably longer than the projection lengthwise, so that the plate may move lengthwise of the arm $i^2$. Seven crimping-fingers $p^2$ are shown, although the precise number is not essential, and the edges of the plate $o^2$ are so notched or shaped (see Fig. 12) that as the plate $o^2$ is shoved forward the upper ends of the fingers $p^2$, which lie in the notches, will be thrown outwardly and their lower ends brought into contact with the upper, said lower ends being serrated, if desired, as shown at $t^2$, Fig. 13. To move the plate $o^2$ a lever $a^3$, provided with a suitable handle, is pivoted to the arm $i^2$ at the rear of the plate $o^2$, the portion of said lever $a^3$ which bears on the plate $o^2$ being cam-shaped, as shown, Fig. 12, so that as the handle $a^3$ is drawn forward the plate $o^2$ is moved forward. Springs $a^3$ (see Fig. 13) are secured behind each finger to the arm $i^2$, and tend to reverse the movement of the fingers and of the plate $o^2$ as the handle $a^3$ is shoved back. Inside the crimping-fingers $p^2$ a flexible band $b^3$ is provided, shaped to be laid against the insole of the last and curved to correspond with the curve of the toe of the last. This flexible plate is mounted upon yielding supports $c^3$, and it is preferably fluted or corrugated around the toe, each of the five fingers $p^2$ which surrounds the toe being set opposite the hollow between two corrugations, so that the upper will be gathered or creased as the fingers close upon it. The yielding plate $b^3$ co-operates with the fingers and is located, as shown in Fig. 13, behind the upper, which is shown at $c^{31}$ in said figure projecting upwardly between the said flexible band or plate $b^3$ and the ends of the fingers $p^2$. This band $b^3$ serves as the inner member of the gripping device, the fingers being the outer member thereof—that is, the edge of the upper is seized between the ends of the fingers and the yielding band or piece $p^3$. After the upper has been so seized it is necessary to draw the upper smoothly over the last, and to this end the plate $b^3$ and fingers should have an upward, almost vertical, movement. This is accomplished by means of the pin $d^3$, which is set vertically in an aperture in the forward enlarged end of the arm $i^2$. (See Fig. 13.) A spiral spring $e^3$ encircles the lower end of this pin, its upper end resting against the under side of the said enlarged end of the arm $i^2$. This spring serves to raise the arm $i^2$ relatively to the pin $d^3$ when the pressure of the operating-cam $f^3$ is relieved. The cam $f^3$ is provided with a lever arm or handle, as shown, and is pivoted in a slot in the lug or projection $q^2$, so that when the arm is thrown forward the leverage of the cam against the top of the pin $d^3$ serves to raise the end of the arm $i^2$, while the last is held securely down by the lower end of the pin $d^3$, which rests on the insole, this upward movement of the arm $i^2$ occurring after the edge of the upper $c^3$ has been seized between the ends of the fingers $p^2$, and the flexible band $b^3$ serves to draw the upper tightly and smoothly over the last in much the same way as the laster draws it when a shoe is lasted by hand. I have said that the lower end of the pin $d^3$ rested on the insole. As a matter of fact, there is between the lower end of said pin and the insole a flexible sheet of metal $g^3$ of sole shape, which preferably substantially covers the insole, although it may cover only a portion of it. At the shank portion of the shoe two pivoted arms $h^3$ (see Fig. 14) are provided, which co-operate with the lasting-plates at that point and which serve substantially the same purpose as the flexible plate $b^3$ does at the toe of the shoe. These arms $h^3$ are pivoted at $i^3$ on either side of the arm $i^2$, lugs being provided thereon for this purpose, while a cross-bolt $j^3$ extends across between said arms, passing through apertures therein, which serves to prevent the arms spreading more than is desired. Encircling this bolt and placed between said arms is a spiral spring $k^3$, which serves to keep the arms spread, and at the same time allows them to yield under the inward movement of the lasting-plates. When the shoe is in position in the machine, the operator lowers the arm $i^2$ and places the plate $g^3$ on the insole, taking care that the edge of the upper extends between the ends of the fingers $p^2$ and the plate $b^3$. He then draws the handle $a^3$ toward him, which moves the plate $o^2$ and throws the lower ends of the fingers $p^2$ inward, gripping the edge of the upper between them and the plate $b^3$. The handle of the cam-lever $f^3$ is then drawn forward, which raises the finger-gripping mechanism and draws the upper tightly and smoothly over the last. The operator then puts his foot on the treadle and the lasting-plates close in, drawing the upper into position and securing it there.

The mechanism for operating the blocks which carry the lasting-plates is as follows: The heel and toe blocks $s'$ $r'$ are shown as mounted on plates $s^3$ $r^3$, but they in fact form part of said plates $s^3$ $r^3$, and may be integral therewith. These plates $s^3$ $r^3$ are grooved to fit a dovetail on the supporting-blocks $s^4 r^4$, the latter being bolted securely to the table C. The plates $s^3 r^3$ extend laterally beyond the blocks $s^4 r^4$, and are of the shape in top view shown in Figs. 16 and 17. On the under side of said plates at either end thereof are cut cam-slots $l^3$, in each of which a cam stud or roll $m^3$ works. These cam-studs project upwardly from horizontal arms $n^3$, which are firmly secured to the ends of the carrier-blocks $q'$. As the carrier-blocks $q'$ move inwardly toward each other the studs or rolls $m^3$ move along the cam-slots $l^3$ and force the heel and toe blocks toward each other, as will be clear. The means for operating the carrier-blocks $q'$ are shown in Figs. 5 and 6. A stud or projection $o^3$, extending below the table C, is secured therein by screw-nuts or otherwise at either side of the carrier-blocks $q'$, and to these projections one arm $p^3$ of a toggle device is pivoted, the other arm $q^3$ of the toggle being pivoted to a downward projection of the carrier-blocks $q'$, the table C being cut away to accommodate said projection, as also the toggle device. The toggle-pivot $t^3$ serves also to secure the link $a^4$ to the toggle-arms, the lower end of said link being pivoted to a cross-bar $b^4$, by means of which both toggle devices are connected and moved in unison. As will be obvious, any well-known equivalent device may be used in place of the toggle mechanism for actuating the carrier-blocks $q'$. If now the cross-bar $b^4$ be moved upwardly from the position shown in Fig. 5 to that shown in Fig. 6, the lasting-plates will be closed on the shoe. The bar $b^4$ passes directly across the top of the vertical bar or pin $l'$, which, as has been previously explained, is moved upwardly by the cam $a'$, and as the pin $l'$ moves upwardly it comes in contact with the bar $b^4$, forcing the bar upwardly, straightening the toggles $q^3 p^3$, and forcing the carrier-blocks and plates inwardly onto the shoe. The pin $l'$ moves upwardly a short distance farther than is required to straighten the toggles $q^3 p^3$, and this latter part of its movement serves to raise a bar $c^4$, which is set at right angles substantially to the bar $b^4$, (see Fig. 4,) and thus to give a slight upward movement to the last, the ends of said bar coming in contact with the adjusting-collars $d^4$, which are screwed onto the lower end of the heel and toe supports $a^2 b^2$. This slight upward movement of the last serves to smooth or straighten out the insole in case it should be accidentally wrinkled when laid, and it also permits the machine to automatically accommodate itself to insoles of varying thicknesses. After the plates have thus been thrown in and the shoe lasted the table is swung around to the sole-layer and thence around a quarter of a circle at a time until the shoe is taken out of the machine. It is therefore desirable that the plates and their operating parts should be held firmly in the position in which they are left while the table is being revolved. To this end I provide pins $e^4$, Figs. 10 and 11, which are set firmly in the bar $b^4$, while co-operating with these pins are pivoted latches $f^4$, which are pivoted underneath the table and which are drawn against the pins by springs $g^4$, so that as the bar $b^4$ is raised the latches snap over the pins and hold it in its raised position. For the purpose of opening the mechanism a lever $h^4$, which is pivoted in a downward projection $i^4$, secured to the edge of the table, is provided. The outer end of this lever projects downwardly, and is provided with a handle $k^4$, while the inner end projects inwardly over the cross-bar $b^4$. As the operator seizes the handle $k^4$ and pulls up that end of the lever $h^4$ the other end thereof is thrown down, and before it strikes the cross-bar $b^4$ it comes in contact with the levers $j^4$, which are pivoted at $l^4$ to the bar $b^4$. As the ends of these levers which come in contact with the lever $h^4$ are thrown down the other ends thereof are thrown up and act against the beveled ends of the latches $f^4$ to throw the latches back and free them from the pins $e^4$. The further downward pressure of the lever $h^4$ throws down the bar $b^4$ and reverses the movement of the toggle mechanism and the lasting-plates. One of these levers $h^4$ is provided for each of the four lasting devices which are located on the table C.

The sole-laying device consists of a block or form $a^5$, which is suspended from the end of the lever T, the method of operating which has been already described. The block $a^5$ is suspended by means of a link $b^5$, which is pivoted thereto, the upper end of said link being pivoted to a vertical threaded bolt, which is secured by check-nuts in the end of the lever T. By this method of suspension the block $a^5$ may be shifted slightly lengthwise of the sole of the shoe. Underneath the block is secured a yielding plate $c^5$, preferably of metal, which is secured to the block $a^5$ by set-screws $d^5$, which pass into blocks $e^5$, to which the said plate $c^5$ is secured. To the under side of the said plate is secured a sheet of rubber $f^5$ of the shape of a sole and of considerable thickness, and to the lower or under side of the rubber is secured a lead plate $f^{12}$, which comes in contact with the sole of the shoe. This rubber serves to yield slightly, and thus to allow the lead plate to accommodate itself to the inequalities of the surface against which it presses and at the same time is rigid enough to transmit a strong pressure to the sole of the shoe, so that the sole will be firmly pressed and set in position. By means of the screws $d^5$ the position of the flexible plate $f^5$ and its backing $c^5$ may be slightly changed and adjusted.

For the purpose of holding the sole-laying block pressed tightly against the sole during the time that the operator is lasting the succeeding shoe I have provided a lever $b^6$, (see Fig. 2,) which is pivoted at one end on top of the upright A and is drawn beneath the collar $r$ on the rod $n$ at the rear end of the lever T by means of a spring $d^6$. As the rear end of said lever is raised by the upward movement of the rod $n$, the lever $b^6$ is drawn under it by the said spring $d^6$, and serves as a wedge (it being slightly wedge-shaped at that point, if desired) to hold that end of the lever in the highest position to which it is raised, thus securing the sole-laying block in the position in which it exerts its greatest pressure on the sole. When the operator has finished lasting the shoe which he is at work upon, he presses back the lever $b^6$ and allows the rear end of the lever T to fall. The lever $b^6$ will then lie against the rear end of the lever T until the end of said lever is again raised to allow the lever $b^6$ to pass under it. In case the lever $b^6$ is not desired, at any time, it may be held permanently in its rearward position by putting in a stop-pin or similar device to prevent its operation.

In Fig. 18 I have shown a modified form of sole-laying block, in which the lead plate is replaced by a ridge of lead $f^{13}$ of the cone shape, in cross-section shown, the edge of the said ridge of lead being of sole shape in plan view and adapted to press on the sole around the edge thereof and thus to lay the sole smoothly in place.

I do not desire to limit myself to the use of a lead plate or facing, as any equivalent inelastic material may be employed.

As it may be convenient to allow the sole-laying pressure-block $a^5$ to remain in its downward position—that is, exerting a pressure on the sole without interfering with the vertical movement of the rod $n$—I have arranged the modified form of mechanism shown in Figs. 19, 20, and 21. In this modification I have done away with the collar $r$ and connecting-links $s$, (shown in Fig. 4,) and I do not secure the upper end of the rod $n$ to the lever T. I enlarge the rear end of said lever T, as shown, and provide a hole therethrough, as shown at $d^8$, Fig. 19, of sufficient size to allow the upper end of the rod $n$ to pass freely through. On the under side of this end of the lever I dovetail a slide $e^8$, which, when in its inward position, covers the hole $d^8$ and receives the upward pressure of the rod $n$, which operates the lever T, but which, when withdrawn, allows the rod $n$ to pass up through the hole $d^8$, and thus prevents the rod from operating the lever. It will be clear, therefore, that the operation of the lever T will depend upon the position of the plate $e^8$. The plate $e^8$ is provided with a pin $f^8$, with which a spring $g^8$ is in contact, said spring being secured to the under side of the said lever T, as shown. The spring $g^8$ operates to throw the plate $e^8$ outwardly and to keep said plate normally in the position shown, Figs. 19 and 21, and said plate is prevented from being thrown too far out by the stop-pin $i^8$, which passes through a slot in said plate into the said lever, as shown, Fig. 21. For operating the plate $e^8$ in the opposite direction, the lever $b^6$, modified as shown, Fig. 19, is employed, said lever being pivoted at $j^8$ to the top of the central standard A. An upwardly-projecting pin $k^8$ is rigidly secured to the end of said lever $b^6$ and comes in contact with the end of the said plate $e^8$. By moving the lever $b^6$ the operator can force the plate $e^8$ inwardly into line with the ascending rod $n$, and thus cause the operation of the lever T. A spring $l^8$, secured to the top of the standard A, presses against the end of the lever $b^6$ and acts, when the end of the lever T is raised, to throw the lever $b^6$ in toward the rod $n$. The upright $m^8$ on the lever $b^6$ is thus thrown under the lever T when the rear end of said lever is raised, thus keeping the sole-pressing block firmly pressed against the sole. The parts will remain in this position until the operator reverses the movement of lever $b^6$, when the rear end of lever T will drop under the pressure of spring $p$, which is in this case secured outside the standard A, as shown, Fig. 20. To operate lever T, the operator seizes the lever $b^6$ and forces the plate $e^8$ inwardly, as above explained.

For the purpose of correctly setting the blocks $c^2$, which are pivoted on top of the carrier-blocks $q'$, (see Fig. 5,) a spring-catch $q^{14}$ (see Fig. 9) is secured in a slanting notch or recess $r^{14}$ in the carrier-block $q'$. The catch $q^{14}$ is rounded or beveled on one side, so that as the block $c^2$ is turned on its pivot it will pass over and depress the catch $q^{14}$, and as soon as the block $c^2$ has passed the catch the catch will fly up, and the said block $c^2$ may then be pressed against it and secured and will then be in the right position. This enables the block $c^2$ to be accurately set, even in the dark. Figs. 7 and 8 show a portion of the lasting-plate $u^2$, (Fig. 7 being a section on line 7 7 of Fig. 8,) together with a sole-guide $s^{14}$, which is mounted on a sliding bolt $p^{141}$, which is normally held pressed forward toward the shoe by a spiral spring $o^{14}$. The bolt $p^{141}$ is set in a horizontal aperture in the upper portion of the upright which supports the lasting-plate $u^2$, and which is, in fact, a projection from the block $c^2$. The forward end of said bolt $p^{141}$ comes in contact with the sides of the last and has a tendency to center the last. The gage $s^{14}$ is directly secured to a small block located on top of the forward end of the bolt $p^{141}$, as shown in Fig. 7.

What I claim is—

1. In a lasting-machine, the combination, with the side, toe, and heel lasting plates and sliding blocks carrying said plates and adapted to be moved in and out or toward and from the work, of a support $i^2$ above the last, a flexible or yielding band $b^3$, sustained by said support and arranged to be inside of the upper at the toe of the shoe, and a series of crimping-fingers $p^2$, also sustained by said support above the last and co-operating with said band to gather in and crimp the upper at the toe of the shoe.

2. In a lasting-machine, the combination, with the side, toe, and heel lasting plates and sliding blocks carrying said plates and adapted to be moved in and out or toward and from the work, of a support $i^2$ above the last, a flexible band $b^3$, sustained by said support and arranged to be inside of the upper at the toe of the shoe, laterally-yielding supports $c^3$ for said band, and a series of crimping-fingers $p^2$, also sustained by said support $i^2$ and co-operating with said band.

3. In a lasting-machine, the combination, with the laterally-movable side, toe, and heel lasting plates, of the vertically-movable flexible band $b^3$, a support $i^2$, by which said band is sustained above the last, the crimping-fingers $p^2$, also sustained by said support, and the sliding plate $o^2$ and its operating-lever to actuate said fingers.

4. In a lasting-machine, the combination, with the sliding carrier-blocks $q'$ and the table C, provided with ways in which said blocks slide, of the cross-bar $b^4$, automatic mechanism for reciprocating said bar, and the toggles consisting of the links $p^3$, connected with said table and with said bar, and the links $q^3$, connected with the said bar and the said sliding blocks.

5. In a lasting-machine, the combination of the carrier-blocks $q'$, their link and toggle actuating mechanism, cross-bar $b^4$, and the latches $f^4$, substantially as shown and described.

6. In a lasting-machine, the combination of the carrier-blocks, their link and toggle actuating mechanism, cross-bar $b^4$, the latches $f^4$, and the releasing-levers $j^4$, substantially as shown and described.

7. In a lasting-machine, the combination of the sliding carrier-blocks $q'$, their link and toggle operating mechanism, the cross-bar $b^4$, and the pivoted lever $h^4$.

8. In a lasting-machine, the combination of the cross-bar $b^4$, pivoted latches $f^4$, pins $e^4$, releasing-levers $j^4$, and the lever $h^4$, substantially as shown and described.

9. In a lasting-machine, the combination, with the table C and the sliding carrier-blocks $q'$, movable in ways on said table, of the cross-bar $b^4$, the vertically-movable rod $l'$, its actuating-cam $a'$, the rotating shaft by which said cam is carried, and the toggles consisting of the links $p^3$, connected with said table and with said bar, and the links $q^3$, connected with said bar and said sliding blocks.

10. In a lasting-machine, the combination, with the vertically-movable rod $l'$ and its actuating-cam, of the cross-bar $c^4$, the lasting devices operated from said cross-bar, and the heel and toe supports $a^2$ $b^2$, substantially as shown and described.

11. In a lasting machine, the combination, with the shoe-holding mechanism, of the pivoted arm $i^2$, the yielding plate or band $b^3$, the crimping-fingers $p^2$, mounted on said arm, the sliding pin $d^3$, and the cam $f^3$, whereby after the edge of the upper has been seized by said crimping-fingers the arm $i^2$ may be forced upwardly to draw the upper smoothly into place, substantially as shown and described.

12. In a lasting-machine, the combination, with the shoe-holding mechanism, of the arm $i^2$, mounted in a socket $j^2$, pivoted to a stationary part of the machine, said arm $i^2$ being provided with seizing and crimping fingers $p^2$, and a yielding plate $b^3$, co-operating with said fingers and said socket, having a retaining-latch $n^2$, whereby said arm may be adjusted, substantially as shown and described.

GEORGE McPHERSON.

Witnesses:
WM. A. MACLEOD,
EMERSON B. PETTIT.